(12) United States Patent
Onodera et al.

(10) Patent No.: US 9,278,400 B2
(45) Date of Patent: Mar. 8, 2016

(54) ELECTRIC-DISCHARGE MACHINING DEVICE

(75) Inventors: Yasuo Onodera, Chiyoda-ku (JP);
Hiroki Hikosaka, Chiyoda-ku (JP);
Kazunari Morita, Chiyoda-ku (JP);
Hidetaka Katougi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 305 days.

(21) Appl. No.: 13/993,124

(22) PCT Filed: Jul. 25, 2012

(86) PCT No.: PCT/JP2012/068867
§ 371 (c)(1),
(2), (4) Date: Jun. 11, 2013

(87) PCT Pub. No.: WO2014/016923
PCT Pub. Date: Jan. 30, 2014

(65) Prior Publication Data
US 2014/0027409 A1   Jan. 30, 2014

(51) Int. Cl.
*B23H 1/02* (2006.01)
*B23H 7/04* (2006.01)
*B23H 7/20* (2006.01)

(52) U.S. Cl.
CPC ..................... *B23H 1/024* (2013.01)

(58) Field of Classification Search
CPC ............ B23H 1/00; B23H 1/02; B23H 1/024; B23H 7/00; B23H 7/14; B23H 7/16
USPC ............................ 219/69.13, 69.18
See application file for complete search history.

(56) References Cited

U.S. PATENT DOCUMENTS

| 4,236,057 A | 11/1980 | Inoue |
| 4,510,364 A * | 4/1985 | Ito ............................. 219/69.16 |
| 4,892,989 A | 1/1990 | Itoh |
| 5,231,257 A | 7/1993 | Sasaki |
| 5,496,984 A | 3/1996 | Goto et al. |

(Continued)

FOREIGN PATENT DOCUMENTS

| JP | 53-101194 A | 9/1978 |
| JP | 59-205233 A | 11/1984 |

(Continued)

*Primary Examiner* — Brian Jennison
(74) *Attorney, Agent, or Firm* — Sughrue Mion, PLLC; Richard C. Turner

(57) ABSTRACT

An electric-discharge machining device including an electric-discharge-state determination unit that determines whether an electric discharging state between a machining electrode and a workpiece is either a state of normal electric discharge or of abnormal electric discharge, and a machining-condition switching unit that changes at least one machining condition, further includes a storage unit that stores therein an electric-discharge-state determination indicator, a standard-deviation calculation unit, and a boundary calculation unit that calculates a boundary to be applied to a determination in the electric-discharge-state determination unit based on the electric-discharge-state determination indicator, wherein the machining-condition switching unit changes the machining condition according to a comparison result between the standard deviation calculated by the standard-deviation calculation unit and a standard deviation reference set as a reference of the standard deviation.

5 Claims, 7 Drawing Sheets

(56) References Cited

U.S. PATENT DOCUMENTS

| | | | |
|---|---|---|---|
| 6,396,021 B1 * | 5/2002 | Sato et al. | 219/69.12 |
| 2008/0203068 A1 | 8/2008 | Ukai et al. | |
| 2012/0103943 A1 * | 5/2012 | Onodera et al. | 219/69.12 |

FOREIGN PATENT DOCUMENTS

| | | |
|---|---|---|
| JP | 61-109620 A | 5/1986 |
| JP | 02-065926 A | 3/1990 |
| JP | 04-183525 A | 6/1992 |
| JP | 09-011043 A | 1/1997 |
| JP | 2858515 B2 | 12/1998 |
| JP | 2002-154014 A | 5/2002 |
| WO | 2008/047451 A1 | 4/2008 |
| WO | 2008/047452 A1 | 4/2008 |

* cited by examiner

ELECTRIC-DISCHARGE MACHINING DEVICE

CROSS REFERENCE TO RELATED APPLICATIONS

This application is a National Stage of International Application No. PCT/JP2012/068867 filed Jul. 25, 2012, the contents of all of which are incorporated herein by reference in their entirety.

FIELD

The present invention relates to an electric-discharge machining device.

BACKGROUND

In a die-sinking electric-discharge machining device, machining can be made unstable due to electric discharge concentration that occurs earlier than a response time of electrode feed (an arc state), thereby causing arc traces on a workpiece. When arc traces are produced, surface roughness and shape accuracy are degraded. Conventionally, in order to avoid this phenomenon, an electric discharging state between a machining electrode and a workpiece is determined to control machining conditions according to the electric discharging state. For example, Patent Literature 1 discloses a technique in which the discharging state is classified into the state of a normal electric discharge and the state of an abnormal electric discharge (hereinafter just referred to as "normal electric discharge and abnormal electric discharge"), and when abnormal electric discharge is detected, machining condition setting is changed.

In order to classify an electric discharging state into normal electric discharge and abnormal electric discharge, it is necessary to obtain a boundary between normal electric discharge and abnormal electric discharge (hereinafter, simply also "boundary") in advance. Conventionally, the boundary is obtained by an operation that requires a worker's technical knowledge. A fluctuation in boundary setting occurs among workers, and therefore there is a problem that a potential degradation of machining performance exists. Furthermore, generally, it is assumed that the boundary is obtained in a state where many abnormal electric discharges are included, and therefore there is also a problem that a possibility of damaging a machining electrode and a workpiece exists.

CITATION LIST

Patent Literature

Patent Literature 1: Japanese Patent No. 2858515

SUMMARY

Technical Problem

There is an approach that can be carried out with respect to the above problems to obtain a probability density distribution of machining data showing an inter-electrode discharging state and to decide a boundary based on the probability density distribution. Machining data of only normal electric discharge can be used to obtain the boundary by an automatic computation. Therefore, it is possible to eliminate a work that is dependent on worker's technical knowledge. Furthermore, it is possible to reduce damages to a machining electrode and a workpiece. However, in this case, there is a problem that a boundary-calculation error is caused when machining data of normal electric discharge is mixed with machining data of abnormal electric discharge. As the machining data of normal electric discharge is mixed with more machining data of abnormal electric discharge, a boundary-calculation error becomes larger. When an electric discharging state cannot be correctly determined due to a large boundary-calculation error, machining conditions are controlled based on an incorrect determination result of the discharging state, thereby degrading the machining performance.

The present invention has been achieved to solve the above problems, and an object of the present invention is to provide an electric-discharge machining device that is capable of correctly determining an electric discharging state and suppressing degradation of machining performance.

Solution to Problem

In order to solve the aforementioned problems, an electric-discharge machining device is configured to include: an electric-discharge-state determination unit that determines whether an electric discharging state between a machining electrode and a workpiece is either normal electric discharge or abnormal electric discharge; and a machining-condition switching unit that changes a machining condition in machining of the workpiece according to a determination result in the electric-discharge-state determination unit, wherein the electric-discharge machining device further includes: a storage unit that stores therein a state amount according to the electric discharging state as an electric-discharge-state determination indicator that is an indicator for determining the electric discharging state; a standard-deviation calculation unit that calculates a standard deviation of the electric-discharge-state determination indicator read from the storage unit; and a boundary calculation unit that calculates a boundary to be applied to a determination as to whether the electric discharging state is of the normal electric discharge or of the abnormal electric discharge in the electric-discharge-state determination unit based on the electric-discharge-state determination indicator, and wherein in a preparation machining for calculating the boundary in the boundary calculation unit, the machining-condition switching unit changes the machining condition according to a comparison result between the standard deviation calculated by the standard-deviation calculation unit and a standard deviation reference set as a reference of the standard deviation, and when the standard deviation calculated by the standard-deviation calculation unit is smaller than the standard deviation reference, the boundary calculation unit calculates the boundary.

Advantageous Effects of Invention

In the electric-discharge machining device according to the present invention, a boundary calculation unit calculates a boundary when a standard deviation of an electric-discharge-state determination indicator is smaller than a standard deviation reference. The boundary calculation unit is capable of calculating the boundary in a state where normal electric discharge is prevented from being mixed with abnormal electric discharge. An electric-discharge-state determination unit is capable of correctly determining an electric discharging state based on the boundary in which a calculation error is suppressed. Therefore, the electric-discharge machining device controls machining conditions according to a correctly determined discharging state, and consequently can suppress degradation of the machining performance.

DESCRIPTION OF EMBODIMENTS

Exemplary embodiments of an electric-discharge machining device according to the present invention will be explained below in detail with reference to the accompanying drawings. The present invention is not limited to the embodiments.

First Embodiment

Figure 1:
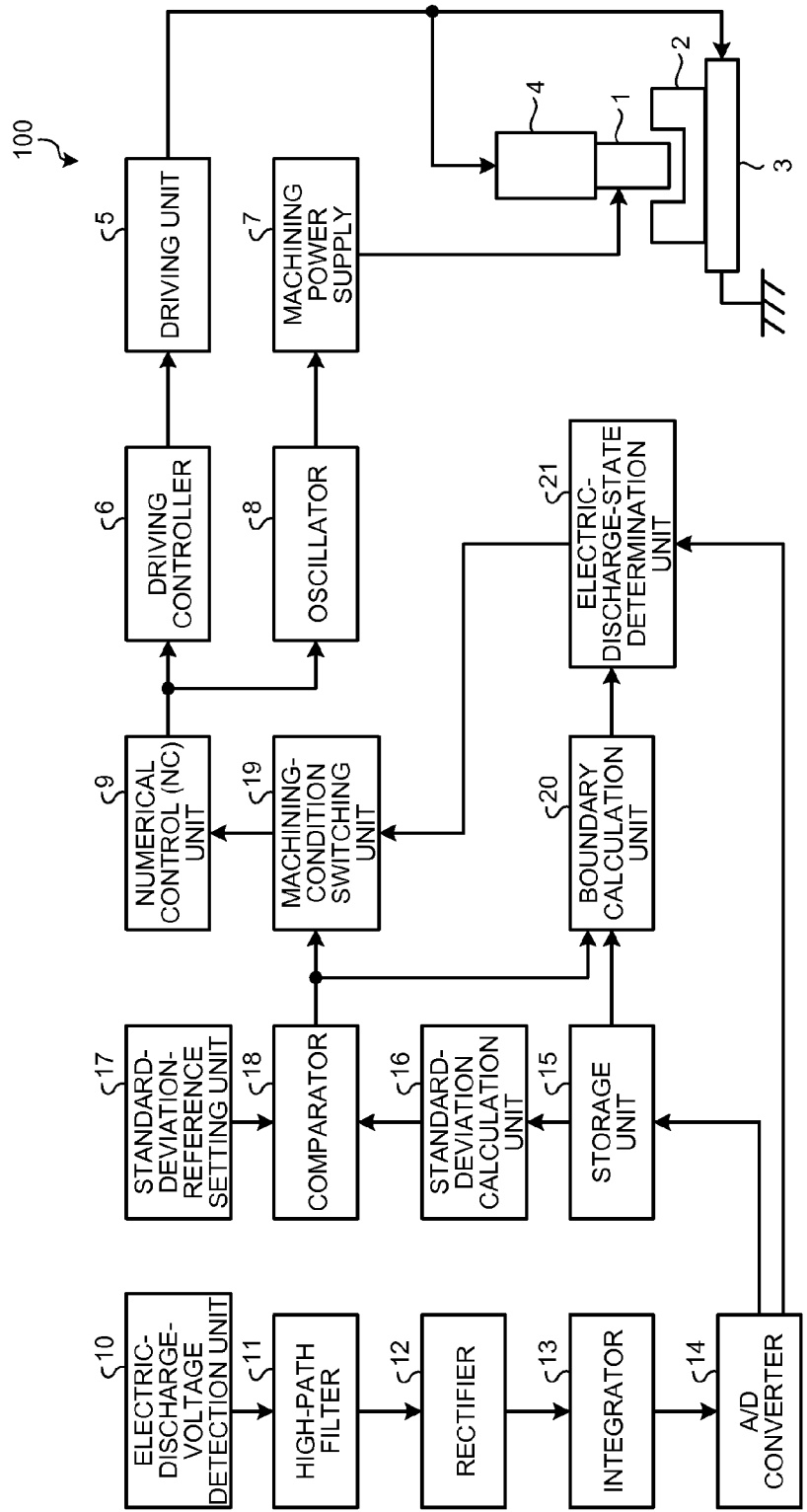
FIG. 1 is a block diagram of a schematic configuration of an electric-discharge machining device according to a first embodiment of the present invention.

FIG. 1 is a block diagram of a schematic configuration of an electric-discharge machining device according to a first embodiment of the present invention. A machining electrode 1 is attached to a main shaft 4. A workpiece 2 is placed on a machining table 3. The machining table 3 is driven in an X-axis direction and a Y-axis direction that are horizontal directions. The main shaft 4 is driven in a Z-axis direction that is a vertical direction.

A driving unit 5 drives the machining table 3 and the main shaft 4 individually. A driving controller 6 controls the driving unit 5. A machining power supply 7 applies a pulse voltage between the machining electrode 1 and the workpiece 2. An oscillator 8 transmits a pulse command to the machining power supply 7. A numerical control (NC) unit 9 controls the driving controller 6 and the oscillator 8 as their upper-side device. An electric-discharge machining device 100 generates pulse discharges between the machining electrode 1 and the workpiece 2 to machine the workpiece 2, while moving the machining electrode 1 and the workpiece 2 relatively to each other at a predetermined speed.

An electric-discharge-voltage detection unit 10 detects an electric-discharge voltage between the machining electrode 1 and the workpiece 2. A high-path filter 11 extracts a high-frequency component from the electric-discharge voltage detected by the electric-discharge-voltage detection unit 10. A rectifier 12 rectifies the high-frequency component extracted by the high-pass filter 11. An integrator 13 integrates the high-frequency component rectified in the rectifier 12.

An A/D converter 14 converts analog data of the integration value from the integrator 13 into digital data. A storage unit 15 stores therein the integration value from the A/D converter 14. A standard-deviation calculation unit 16 calculates a standard deviation of the integration value that is read from the storage unit 15. A standard-deviation-reference setting unit 17 sets a standard deviation reference. Details of the standard deviation reference are described later. A comparator 18 compares the standard deviation calculated by the standard-deviation calculation unit 16 with the standard deviation reference set in the standard-deviation-reference setting unit 17.

A machining-condition switching unit 19 instructs the NC unit 9 to change machining conditions according to a determination result in an electric-discharge-state determination unit 21. In a preparation machining for obtaining a boundary, the machining-condition switching unit 19 instructs the NC unit 9 to change machining conditions according to a comparison result in the comparator 18.

A boundary calculation unit 20 calculates a boundary according to the comparison result in the comparator 18 and the integration value that is read from the storage unit 15. This boundary is the one that is applied to a determination as to whether an electric discharging state is normal electric discharge or abnormal electric discharge in the electric-discharge-state determination unit 21. The electric-discharge-state determination unit 21 determines a discharging state between the machining electrode 1 and the workpiece 2 according to the integration value from the A/D converter 14 and the boundary calculated by the boundary calculation unit 20.

The principle of adjustment of machining conditions according to an electric discharging state in the first embodiment is explained here. Among electric-discharge pulses, there are normal electric discharge that contributes to machining and abnormal electric discharge that does not contribute to machining. An example of an indicator for determining whether an inter-electrode electric-discharging state between the machining electrode 1 and the workpiece 2 is either normal or abnormal includes a state amount such as a low-frequency component (an arc potential) or a high-frequency component of an electric-discharge voltage, and an inter-electrode average voltage in an inactive period. Hereinafter, an indicator for determining an electric discharging state is referred to as "electric-discharging state determination indicator".

Figure 2:
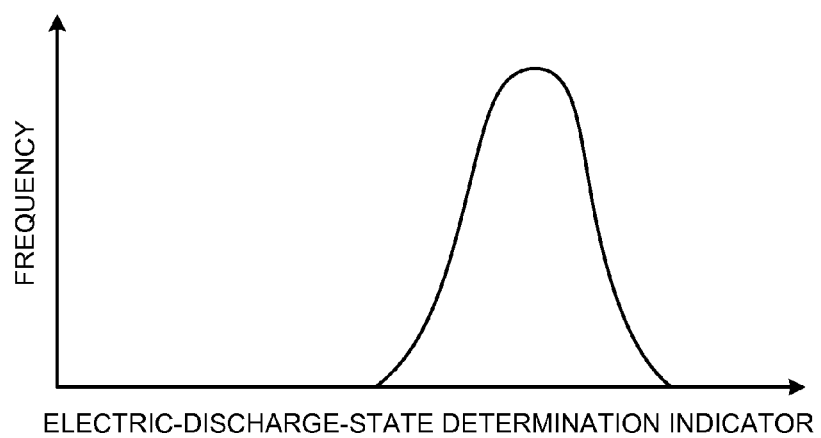
FIG. 2 is an example of a histogram of an electric-discharge-state determination indicator in a stable machining state where normal electric discharge is not mixed with abnormal electric discharge.
Figure 3:
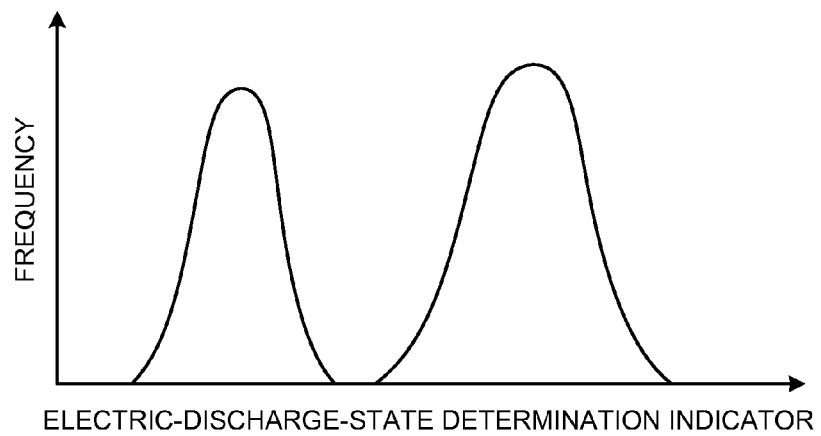
FIG. 3 is an example of a histogram of an electric-discharge-state determination indicator in an unstable machining state where normal electric discharge is mixed with abnormal electric discharge.

FIG. 2 is an example of a histogram of the electric-discharging state determination indicator in a stable machining state where normal electric discharge is not mixed with abnormal electric discharge. FIG. 3 is an example of a histogram of the electric-discharge-state determination indicator in an unstable machining state where normal electric discharge is mixed with abnormal electric discharge. FIGS. 2 and 3 depict a frequency distribution of the electric-discharge-state determination indicator for a sufficient number of electric-discharge pulses, for example, approximately 1,000 discharge pulses.

In the histogram shown in FIG. 2, one peak appears in the frequency distribution. This peak indicates normal electric discharge. In the histogram shown in FIG. 3, two peaks appear in the frequency distribution. Among the two peaks, the higher-level peak indicates normal electric discharge and the lower-level peak indicates abnormal electric discharge.

Figure 4:
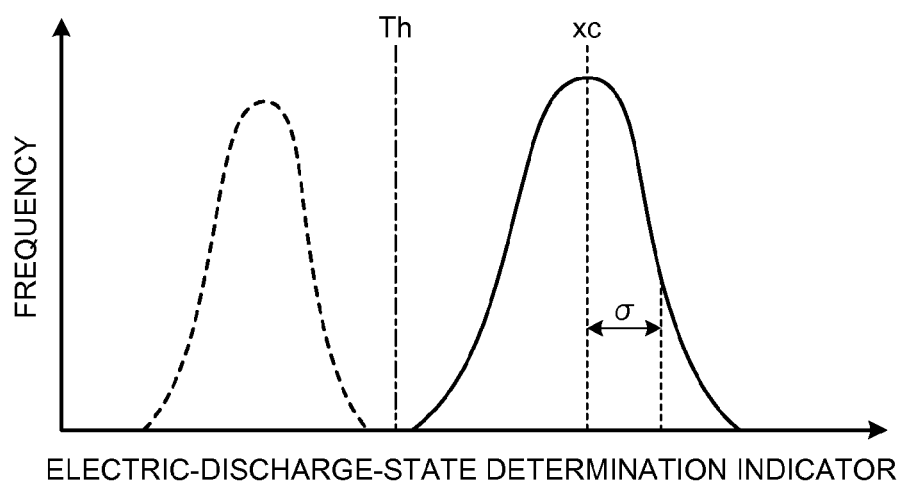
FIG. 4 is an explanatory diagram of a method of obtaining a boundary between normal electric discharge and abnormal electric discharge.

FIG. 4 is an explanatory diagram of a method of obtaining a boundary between normal electric discharge and abnormal electric discharge. A boundary between normal electric discharge and abnormal electric discharge in the histogram shown in FIG. 3 is obtained from the electric-discharge-state determination indicator for normal electric discharge shown in FIG. 2. Where Th represents a threshold value that is the boundary, xc represents an average value of the electric-discharge-state determination indicator for normal electric discharge, σ represents a standard deviation of the electric-discharge-state determination indicator for normal electric discharge, and k represents a predetermined coefficient, Th is calculated by the following equation (1).

$$Th = xc - k \times \sigma \tag{1}$$

According to the above method, the boundary can be obtained in a state where normal electric discharge is not mixed with abnormal electric discharge, without damaging the machining electrode 1 and the workpiece 2. Further, Th can be calculated by automatic computation by acquiring xc and σ from a data group of the electric-discharge-state determination indicator for normal electric discharge. Therefore, it is possible to suppress variations or errors in calculation result between workers.

Figure 5:
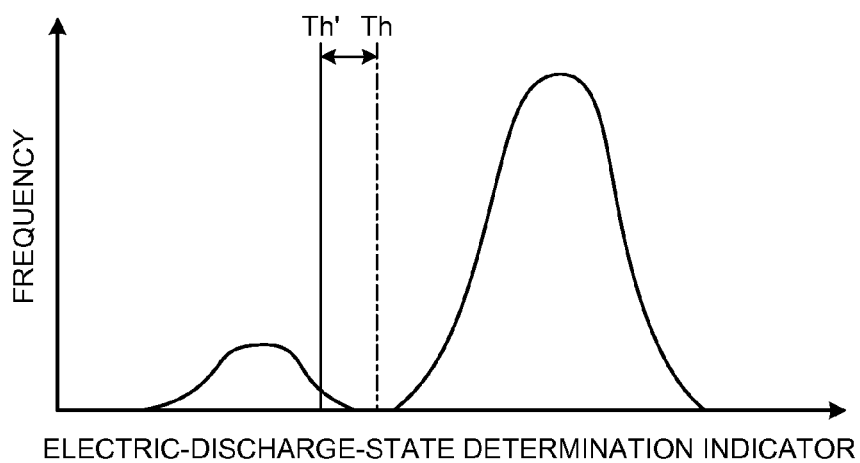
FIG. 5 is an explanatory diagram of a boundary fluctuation in a case where normal electric discharge is mixed with abnormal electric discharge.
Figure 6:
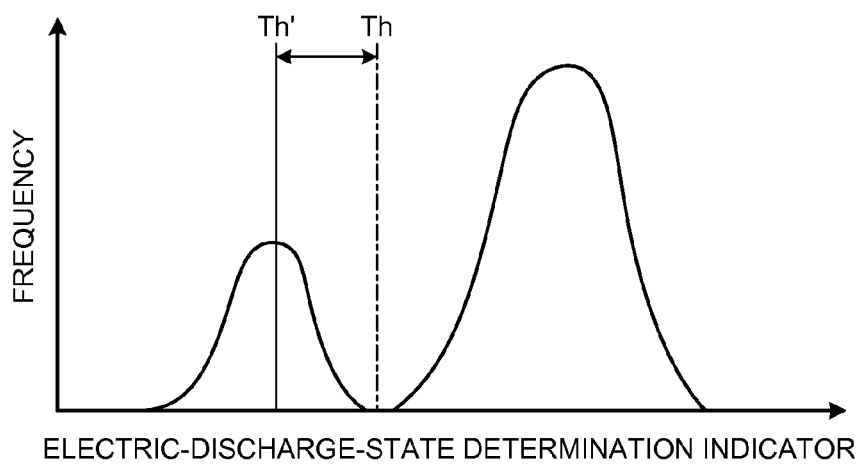
FIG. 6 is an explanatory diagram of a boundary fluctuation in a case where normal electric discharge is mixed with abnormal electric discharge.

However, a problem with the above method is that there is an error in the obtained boundary when machining data of abnormal electric discharge is included in machining data of normal electric discharge. FIGS. 5 and 6 are explanatory diagrams of a boundary fluctuation in a case where normal electric discharge is mixed with abnormal electric discharge. The histogram shown in FIG. 6 indicates that normal electric discharge is mixed with more abnormal electric discharge than the case in the histogram shown in FIG. 5.

When normal electric discharge is mixed with abnormal electric discharge, a value of xc is smaller and a value of σ is larger in the equation (1) as compared with those in a case where normal electric discharge is not mixed with abnormal electric discharge. In a case where normal electric discharge is mixed with abnormal electric discharge, a threshold value Th' calculated from the equation (1) is smaller than a true threshold value Th. As normal electric discharge is mixed with more abnormal electric discharge, a difference between threshold values (Th−Th') becomes larger.

As a value to be adopted as the boundary is smaller relative to the true threshold value Th, there is a stronger possibility to erroneously detect abnormal electric discharge as normal electric discharge. When a value that largely differs from the true threshold value Th is adopted as the boundary to determine an electric discharging state and control machining conditions, abnormal electric discharge is erroneously detected as normal electric discharge. Therefore, it is difficult to change the machining conditions sufficiently to avoid abnormal electric discharge. If avoidance of abnormal electric discharge is insufficient, the machining state becomes unstable and machining performance is degraded. Therefore, in order to correctly obtain a boundary for determining an electric discharging state, it is desirable that machining data of normal electric discharge is not mixed with machining data of abnormal electric discharge.

According to a comparison between the histograms in FIGS. 2 and 3, a standard deviation of an electric-discharge-state determination indicator becomes larger when normal electric discharge is mixed with abnormal electric discharge, as compared to when normal electric discharge is not mixed with normal electric discharge. The present inventors found, as a result of earnest and repeated studies, that there is an upper limit in a standard deviation of an electric-discharge-state determination indicator when normal electric discharge is not mixed with abnormal electric discharge, and normal electric discharge can be determined to be mixed with abnormal electric discharge when the standard deviation of the electric-discharge-state determination indicator is larger than the upper limit. The upper limit is appropriately referred to as "standard deviation reference".

When normal electric discharge is determined to be mixed with abnormal electric discharge, machining conditions are changed until the standard deviation of the electric-discharge-state determination indicator becomes smaller than the standard deviation reference. Therefore, the boundary calculation unit 20 obtains the boundary in a state where normal electric discharge is not mixed with abnormal electric discharge. With this configuration, it is possible to suppress a boundary error, and degradation of machining performance due to the boundary error can be avoided.

Next, an operation of the electric-discharge machining device 100 according to the first embodiment, which is common to preparation machining and actual machining, is explained with reference to FIG. 1. An NC program and machining conditions are input to the NC unit 9 before starting machining. The NC unit 9 transmits a position command to the driving controller 6 according to the NC program and the machining conditions. The driving controller 6 controls the driving unit 5 according to the position command from the NC unit 9.

The driving unit 5 moves the machining table 3 in the X-axis direction and the Y-axis direction. The driving unit 5 moves the main shaft 4 in the Z-axis direction. With this configuration, the machining electrode 1 and the workpiece 2 move relatively to each other in the X-axis, Y-axis, and Z-axis directions.

The NC unit 9 transmits the inputted machining conditions to the oscillator 8. The oscillator 8 generates an electric-discharge pulse command according to the machining conditions, and transmits the electric-discharge pulse command to the machining power supply 7. The machining power supply 7 applies a pulse voltage between the machining electrode 1 and the workpiece 2 according to the electric-discharge pulse command from the oscillator 8. The electric-discharge machining device 100 performs electric-discharge machining on the workpiece 2 by using pulse discharges between the machining electrode 1 and the workpiece 2.

Figure 7:
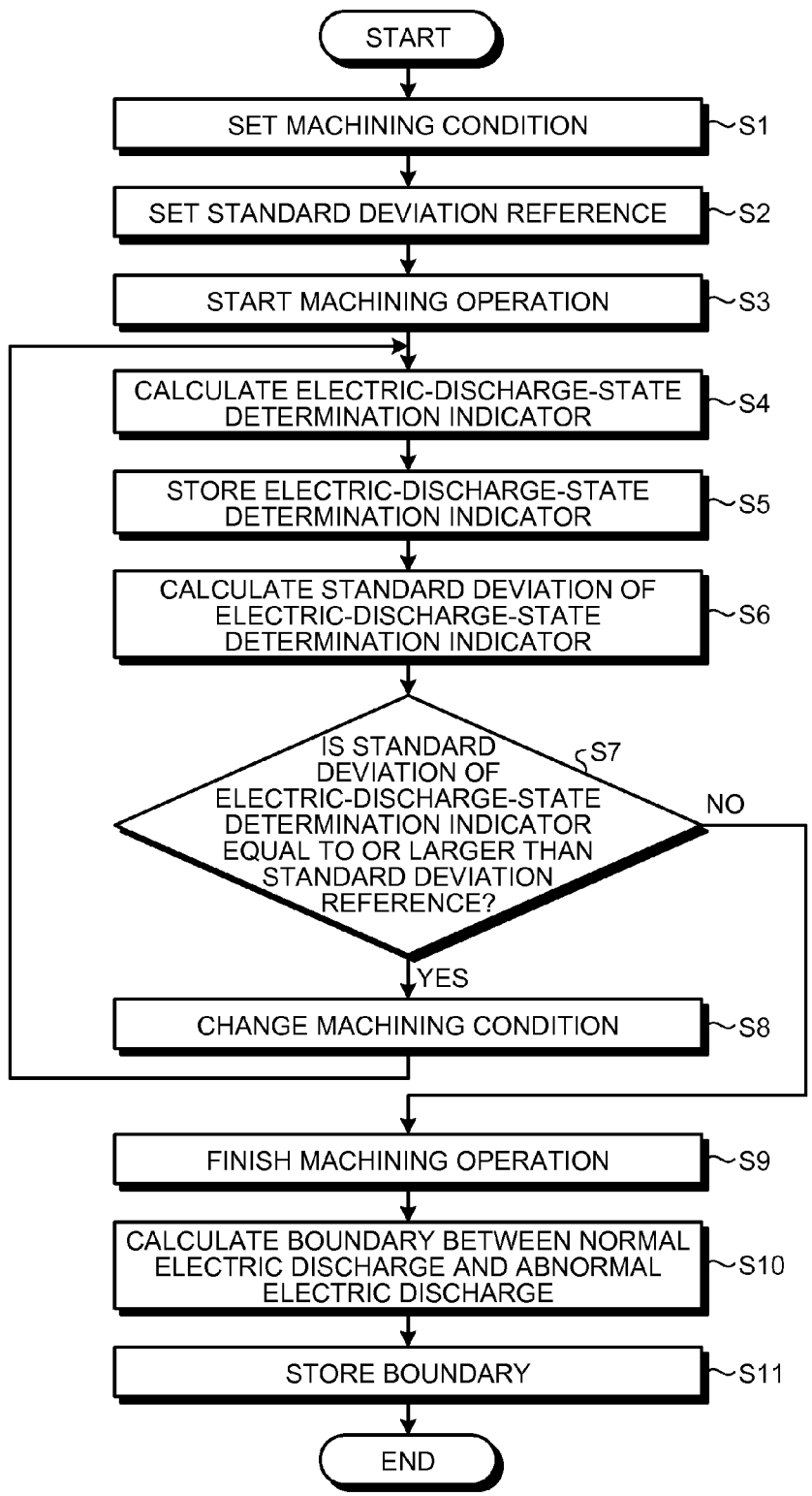
FIG. 7 is a flowchart of a procedure of obtaining a boundary in preparation machining.

Next, an operation of the electric-discharge machining device 100 at the time of preparation machining for obtaining a boundary is explained with reference to FIGS. 1 and 7. FIG. 7 is a flowchart of a procedure of obtaining a boundary in preparation machining. At the time of starting preparation machining, a worker selects a preparation machining mode by a machining-mode selection unit (not shown). When the preparation machining mode is selected, the electric-discharge machining device 100 sets machining conditions for preparation machining in the NC unit 9 (Step S1).

Next, the electric-discharge machining device 100 sets a standard deviation reference of an electric-discharge-state determination indicator in the standard-deviation-reference setting unit 17 (Step S2). A method of deciding a standard deviation reference by the standard-deviation-reference setting unit 17 is described later. The standard deviation reference is set at the time of starting preparation machining, or otherwise can be set at a fixed value before shipment of the electric-discharge machining device 100, for example. When the standard deviation reference is set at a fixed value, the electric-discharge machining device 100 omits Step S2. The electric-discharge machining device 100 starts a machining operation on the workpiece 2 after setting the standard deviation reference (Step S3).

When the electric-discharge machining device 100 starts a machining operation, the electric-discharge-voltage detection unit 10 detects an electric-discharge voltage between the machining electrode 1 and the workpiece 2. The electric-discharge-voltage detection unit 10 transmits a detection result of the electric-discharge voltage to the high-pass filter 11. The high-path filter 11 extracts a high-frequency component from the electric-discharge voltage detected by the electric-discharge-voltage detection unit 10. For example, a cut-off frequency in the high-pass filter 11 is set at a value larger than a response frequency obtained when an inter-electrode voltage is decreased from a no-load voltage to an arc potential immediately after an electric discharge.

The rectifier 12 performs full-wave rectification or half-wave rectification of the high-frequency component extracted by the high-pass filter 11, and transmits the rectified high-frequency component to the integrator 13. The integrator 13 integrates the high-frequency component rectified in the rectifier 12, and transmits the integration value to the A/D converter 14. The A/D converter 14 converts analog data of the integration value of the high-frequency component into digital data.

The A/D converter 14 transmits the integration value converted into digital data to the storage unit 15 as an electric-discharge-state determination indicator. In this manner, the electric-discharge machining device 100 performs processes, which are carried out in each of the structural elements from the high-pass filter 11 to the A/D converter 14, on an electric-discharge voltage detected by the electric-discharge-voltage detection unit 10 to calculate an electric-discharge-state determination indicator (Step S4). The electric-discharge-state determination indicator is a state amount changing according to an electric discharging state, and is an integration value obtained by integrating a high-frequency component of an electric-discharge voltage in this example.

The electric-discharge-state determination indicator is not limited to an integration value obtained by integrating a high-frequency component of an electric-discharge voltage. The electric-discharge-state determination indicator can be other state amounts according to an electric discharging state, for example, a low-frequency component (an arc potential) of an electric-discharge voltage, an inter-electrode average voltage in an inactive period and so on.

The storage unit 15 stores therein an electric-discharge-state determination indicator calculated during a period of the preparation machining (Step S5). The standard-deviation calculation unit 16 reads the electric-discharge-state determination indicator from the storage unit 15, and calculates a standard deviation of the electric-discharge-state determination indicator (Step S6). The standard-deviation calculation unit 16 transmits the calculated standard deviation to the comparator 18.

The comparator 18 compares the standard deviation from the standard-deviation calculation unit 16 with a standard deviation reference set in the standard-deviation-reference setting unit 17 (Step S7). When the standard deviation of the electric-discharge-state determination indicator is equal to or larger than the standard deviation reference (YES at Step S7), the comparator 18 sends a command for changing the machining conditions to the machining-condition switching unit 19. The machining-condition switching unit 19 receives the command from the comparator 18, and instructs the NC unit 9 to change the machining conditions (Step S8).

A case where the procedure advances to Step S8 means that normal electric discharge is mixed with abnormal electric discharge. At Step S8, the machining-condition switching unit 19 changes machining conditions so that normal electric discharge is not mixed with abnormal electric discharge. Changes in machining conditions in order that normal electric discharge is not mixed with abnormal electric discharge are, for example, an extension of inactive period, a reduction of discharging time, an increase in a jump amount, and a reduction of a jump-down time. The machining-condition switching unit 19 can change at least one of machining conditions that are, for example, setting of a resting time, setting of an electric-discharge time, a peak current value, a pulse width, a jump-down time, a jump-up distance, and a machining depth. The electric-discharge machining device 100 repeats the procedure from Step S4 after the machining-condition switching unit 19 changes machining conditions.

When a standard deviation of an electric-discharge-state determination indicator is smaller than a standard deviation reference (NO at Step S7), the comparator 18 transmits a command for calculating a boundary to the boundary calculation unit 20. The electric-discharge machining device 100 finishes the machining operation on the workpiece 2 (Step S9).

The boundary calculation unit 20 receives the command from the comparator 18, and calculates a boundary between normal electric discharge and abnormal electric discharge (Step S10). The boundary calculation unit 20 applies a standard deviation of an electric-discharge-state determination indicator and an average value, which are read from the storage unit 15, to the above equation (1) to calculate the boundary. The electric-discharge-state determination unit 21 stores therein the boundary calculated by the boundary calculation unit 20 (Step S11). The electric-discharge machining device 100 then finishes the operation for obtaining the boundary. The electric-discharge-state determination unit 21 uses the stored boundary for machining control in actual machining.

A procedure to calculate a standard deviation reference is explained here. The standard-deviation-reference setting unit 17 checks whether there is one peak in a frequency distribution in a histogram of an electric-discharge-state determination indicator stored in the storage unit 15. A case where there is only one peak means that normal electric discharge is not mixed with abnormal electric discharge. The standard-deviation-reference setting unit 17 defines a standard deviation of an electric-discharge-state determination indicator, which is obtained when it is confirmed that there is one peak, as a standard deviation reference.

A case where there are two or more peaks in the frequency distribution means that normal electric discharge is mixed with abnormal electric discharge. When it is confirmed that there are two or more peaks confirmed, the machining-condition switching unit 19 changes the machining conditions until only the peak indicating normal electric discharge remains, and the peak indicating abnormal electric discharge disappears. The standard-deviation-reference setting unit 17 defines a standard deviation of an electric-discharge-state determination indicator, which is obtained when it is confirmed that there is one peak confirmed after changing the machining conditions, as a standard deviation reference.

Changes in machining conditions in order that normal electric discharge is not mixed with abnormal electric discharge are, for example, an extension of the inactive period, a reduction of an discharging time, an increase in a jump amount, and a reduction of a jump-down time. The machining-condition switching unit 19 can change at least one of the machining conditions including, for example, a peak current value, a pulse width, a resting time, a jump-down time, a jump-up distance, and a machining depth.

Figure 8:
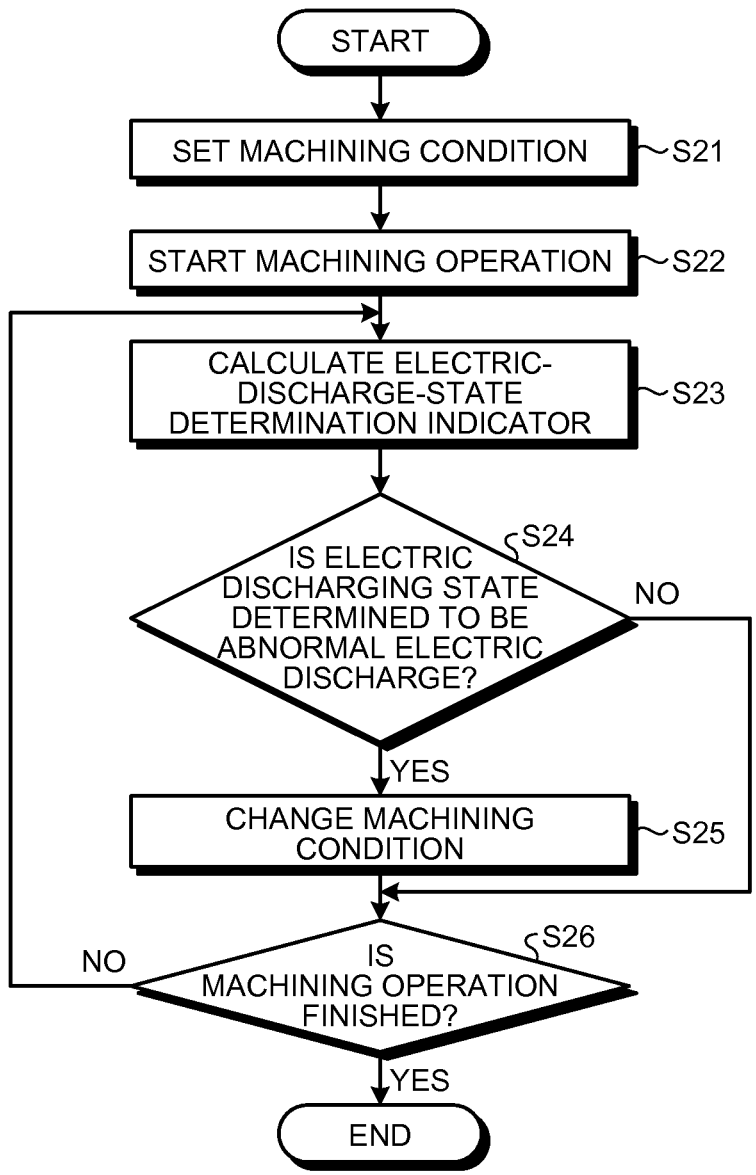
FIG. 8 is a flowchart of a procedure of actual machining.

Next, an operation of the electric-discharge machining device 100 at the time of actual machining is explained with reference to FIGS. 1 and 8. FIG. 8 is a flowchart of a procedure of actual machining. The electric-discharge machining device 100 performs actual machining, while controlling machining conditions by using a boundary calculated in preparation machining.

At the time of starting actual machining, a worker selects an actual machining mode by a machining-mode selection unit (not shown). When the actual machining mode is selected, the electric-discharge machining device 100 sets machining conditions for actual machining in the NC unit 9 (Step S21). The electric-discharge machining device 100 starts a machining operation on the workpiece 2 (Step S22).

When the electric-discharge machining device 100 starts a machining operation, the electric-discharge-voltage detection unit 10 detects an electric-discharge voltage between the machining electrode 1 and the workpiece 2. The electric-discharge machining device 100 calculates an electric-discharge-state determination indicator by the same process as in the preparation machining (Step S23). The A/D converter 14 transmits an integration value converted into digital data to the electric-discharge-state determination unit 21 as an electric-discharge-state determination indicator.

The electric-discharge-state determination unit 21 compares the electric-discharge-state determination indicator from the A/D converter 14 with a boundary calculated in the preparation machining, and determines whether an electric discharging state between the machining electrode 1 and the workpiece 2 is either normal electric discharge or abnormal electric discharge (Step S24). Specifically, in a case where an integration value of a high-frequency component of the electric-discharge voltage is used as an electric-discharge-state determination indicator, when the electric-discharge-state determination indicator is smaller than the boundary, the electric-discharge-state determination unit 21 determines that the electric discharging state is abnormal electric discharge. When the electric-discharge-state determination indicator is larger than the boundary, the electric-discharge-state determination unit 21 determines that the electric discharging state is normal electric discharge. The electric-discharge-state determination unit 21 transmits the determination result of the electric discharging state to the machining-condition switching unit 19.

When the electric-discharge-state determination unit 21 determines that the electric discharging state is abnormal electric discharge (YES at Step S24), the machining-condition switching unit 19 changes machining conditions in order that normal electric discharge is not mixed with abnormal electric discharge (Step S25). Changes in machining conditions in order that normal electric discharge is not mixed with abnormal electric discharge are, for example, an extension of the inactive period, a reduction of a discharging time, an increase in a jump amount, and a reduction of a jump-down time. The machining-condition switching unit 19 can change at least one of machining conditions including, for example, a peak current value, a pulse width, a resting time, a jump-down time, a jump-up distance, and a machining depth.

After the machining-condition switching unit 19 changes machining conditions (Step S25), and the electric-discharge-state determination unit 21 determines that the electric discharging state is normal electric discharge (NO at Step S24), the electric-discharge machining device 100 determines as to whether the NC unit 9 receives an instruction to finish the machining operation (Step S26). When the NC unit 9 receives the instruction to finish the machining operation (YES at Step S26), the electric-discharge machining device 100 finishes the machining operation in actual machining. When the NC unit 9 does not receive the instruction to finish a machining operation (NO at Step S26), the electric-discharge machining device 100 continues the machining operation and repeats the operation from Step S23.

In the electric-discharge machining device 100 according to the first embodiment, the boundary calculation unit 20 calculates a boundary when the standard deviation of an electric-discharge-state determination indicator is smaller than a standard deviation reference. The boundary calculation unit 20 is capable of calculating the boundary in a state where normal electric discharge is prevented from being mixed with abnormal electric discharge. The electric-discharge-state determination unit 21 is capable of correctly determining an electric discharging state based on the boundary in which a calculation error is suppressed. Therefore, the electric-discharge machining device 100 controls machining conditions according to a correctly determined electric discharging state, and consequently can suppress degradation of machining performance. The electric-discharge machining device 100 can achieve an improvement of yields by suppressing degradation of machining performance.

Second Embodiment

Figure 9:
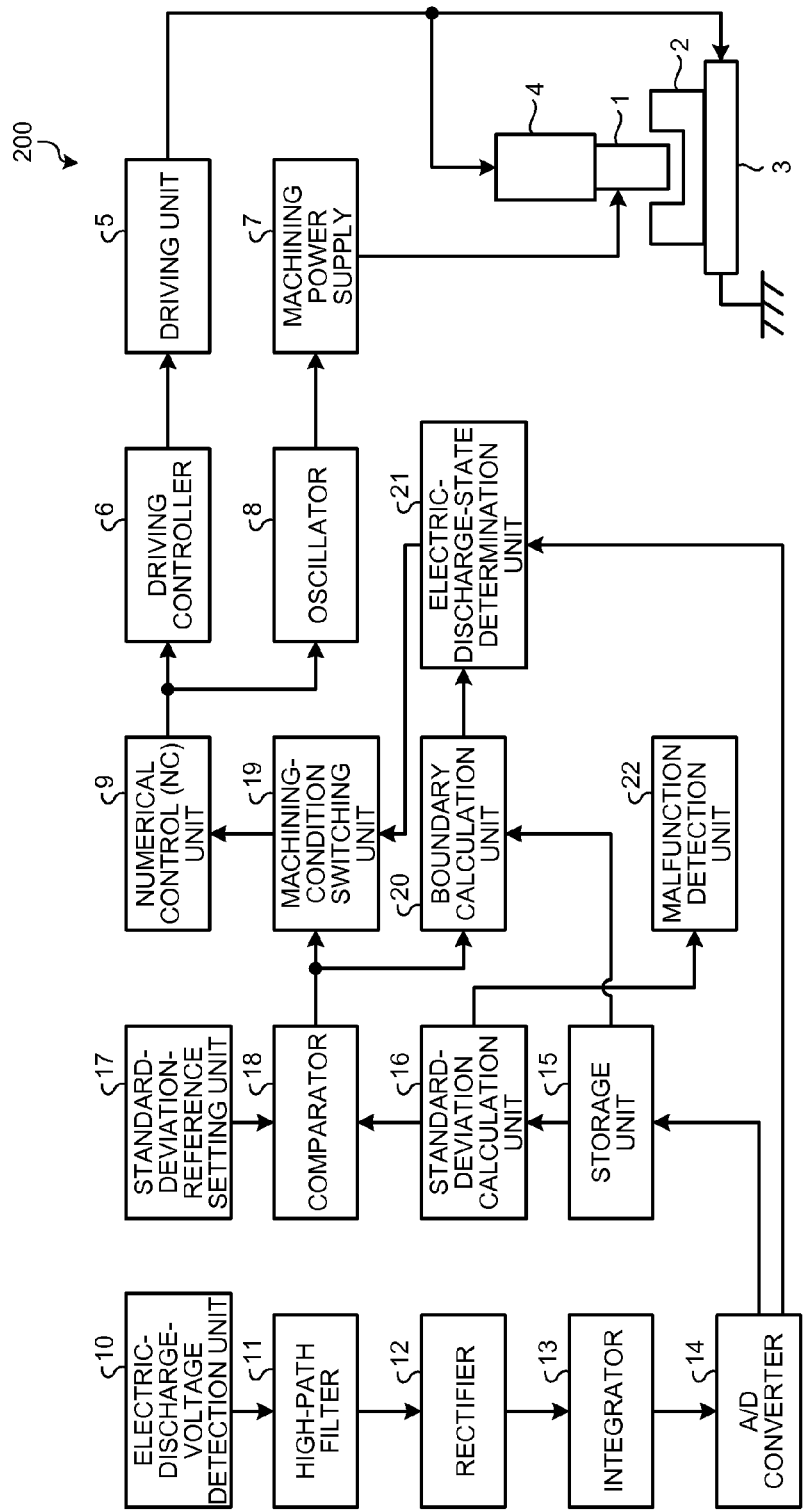
FIG. 9 is a block diagram of a schematic configuration of an electric-discharge machining device according to a second embodiment of the present invention.

FIG. 9 is a block diagram of a schematic configuration of an electric-discharge machining device according to a second embodiment of the present invention. Parts identical to those of the first embodiment described above are denoted by like reference signs and redundant explanations thereof will be omitted as appropriate. An electric-discharge machining device 200 includes a malfunction detection unit 22 in addition to respective structural elements in the electric-discharge machining device 100 shown in FIG. 1. The malfunction detection unit 22 detects an occurrence of a malfunction in the electric-discharge machining device 200.

The principle of detection of a malfunction in the second embodiment is explained here. In a case where a malfunction has occurred in the electric-discharge machining device 200 due to some causes, a fault can be caused such as the fact that a machining speed is decreased as compared to a normal machining speed and the electric-discharge machining device 200 easily falls into an arc state. It is quite likely that a worker does not recognize many of the malfunctions in the electric-discharge machining device 200, and machining is continued with reduced productivity.

When a malfunction has occurred in the electric-discharge machining device 200, it is likely that normal electric discharge can be mixed with abnormal electric discharge even during the machining operation under such machining conditions that normal electric discharge is not mixed with abnormal electric discharge at the time of a normal operation. As described in the first embodiment, a standard deviation of an electric-discharge-state determination indicator is larger when normal electric discharge is mixed with abnormal electric discharge than the case where normal electric discharge is not mixed with normal electric discharge. In the second embodiment, the electric-discharge machining device 200 determines that a malfunction has occurred when a standard deviation of an electric-discharge-state determination indicator in the present machining is larger than that in the previous machining, even though the electric-discharge machining device 200 continues machining under the same machining conditions as the previous conditions.

At the time of preparation machining, the malfunction detection unit 22 stores therein a standard deviation calculated by the standard-deviation calculation unit 16. It is desirable that the standard deviation to be stored in the malfunction detection unit 22 is calculated by the standard-deviation calculation unit 16 at the time when no malfunction is confirmed, for example, immediately before shipment of the electric-discharge machining device 200.

It is desirable that the machining condition when the standard-deviation calculation unit 16 calculates the standard deviation to be stored in the malfunction detection unit 22 is that normal electric discharge is mixed with slight abnormal electric discharge. In a case where a standard deviation obtained under an excessively stable machining condition is adopted, normal electric discharge hardly appears to be mixed with abnormal electric discharge although a malfunction has occurred, thereby decreasing malfunction detection sensitivity of the malfunction detection unit 22. Therefore, the malfunction detection unit 22 can enhance the sensitivity for detecting malfunctions by adopting the standard deviation which is obtained under a machining condition in which normal electric discharge is mixed with slight abnormal electric discharge.

The malfunction detection unit 22 checks whether normal electric discharge is mixed with slight abnormal electric discharge by referring to a histogram of an electric-discharge-state determination indicator stored in the storage unit 15, for example. The present invention is not limited to a case where there is only one machining condition when the standard-deviation calculation unit 16 calculates a standard deviation to be stored in the malfunction detection unit 22. It is preferable that the malfunction detection unit 22 stores therein a standard deviation calculated under plural machining conditions usually used by the electric-discharge machining device 200.

The malfunction detection unit 22 compares a stored previous standard deviation with a present standard deviation calculated by the standard-deviation calculation unit 16 in machining under the same machining conditions as the previous conditions. For example, when the present standard deviation is larger than a value obtained by adding a predetermined allowable value to the previous standard deviation, the malfunction detection unit 22 determines that a malfunction has occurred in the electric-discharge machining device 200. When the malfunction detection unit 22 detects an occurrence of a malfunction, the malfunction detection unit 22 instructs an alarm output unit (not shown) that informs an occurrence of a malfunction to output an alarm.

Similarly to the electric-discharge machining device 100 according to the first embodiment, the electric-discharge machining device 200 according to the second embodiment controls machining conditions according to a correctly determined electric discharging state, and therefore can suppress degradation of machining performance. The electric-discharge machining device 200 can achieve an improvement of yields by suppressing degradation of machining performance. Furthermore, the electric-discharge machining device 200 detects an occurrence of a malfunction by the malfunction detection unit 22, and therefore can prevent machining from being continued with reduced productivity. With this configuration, the electric-discharge machining device 200 can continue an efficient operation.

REFERENCE SIGNS LIST

1 machining electrode, 2 workpiece, 3 machining table, 4 main shaft, 5 driving unit, 6 driving controller, 7 machining power supply, 8 oscillator, 9 numerical control unit, 10 electric-discharge-voltage detection unit, 11 high-path filter, 12 rectifier, 13 integrator, 14 A/D converter, 15 storage unit, 16 standard-deviation calculation unit, 17 standard-deviation-reference setting unit, 18 comparator, 19 machining-condition switching unit, 20 boundary calculation unit, 21 electric-discharge-state determination unit, 22 malfunction detection unit, 100, 200 electric-discharge machining device.

The invention claimed is:

1. An electric-discharge machining device comprising:
   an electric-discharge-state determination unit that makes a determination as to whether an electric discharging state between a machining electrode and a workpiece is either a state of normal electric discharge or a state of abnormal electric discharge; and
   a machining-condition switching unit that changes at least one machining condition in machining of the workpiece according to a determination result in the electric-discharge-state determination unit, wherein
   the electric-discharge machining device further comprises:
      a storage unit that stores therein a state amount according to the electric discharging state as an electric-discharge-state determination indicator that is an indicator for determining the electric discharging state;
      a standard-deviation calculation unit that calculates a standard deviation of the electric-discharge-state determination indicator read from the storage unit; and
      a boundary calculation unit that calculates a boundary to be applied to the determination as to whether the electric discharging state is of the normal electric discharge or of the abnormal electric discharge made by the electric-discharge-state determination unit based on the electric-discharge-state determination indicator, and wherein
      in a preparation machining for calculating the boundary in the boundary calculation unit, the machining-condition switching unit changes the machining condition according to a comparison result between the standard deviation calculated by the standard-deviation calculation unit and a standard deviation reference set as a reference of the standard deviation, and
      when the standard deviation calculated by the standard-deviation calculation unit is smaller than the standard deviation reference, the boundary calculation unit calculates the boundary.

2. An electric-discharge machining device comprising:
   an electric-discharge-state determination unit that makes a determination as to whether an electric discharging state between a machining electrode and a workpiece is either a state of normal electric discharge or a state of abnormal electric discharge; and
   a machining-condition switching unit that changes at least one machining condition in machining of the workpiece according to a determination result in the electric-discharge-state determination unit, wherein
   the electric-discharge machining device further comprises:
      a storage unit that stores therein a state amount according to the electric discharging state as an electric-discharge-state determination indicator that is an indicator for determining the electric discharging state;
      a standard-deviation calculator that calculates a standard deviation of the electric-discharge-state determination indicator read from the storage unit; and
      a boundary calculation unit that calculates a boundary to be applied to the determination as whether the electric discharge state is of the normal electric discharge or of the abnormal electric discharge made by the electric-discharge-state determination unit based on the electric-discharge-state determination indicator, and wherein in a preparation machining for calculating the boundary in the boundary calculation unit, the machining-condition switching unit changes the machining condition according to a comparison result between the standard deviation calculated by the standard-deviation calculation unit and a standard deviation reference set as a reference of the standard deviation, and when the standard deviation calculated by the standard-deviation calculation unit is smaller than the standard deviation reference, the boundary calculation unit calculates the boundary, wherein when the standard deviation calculated by the standard-deviation calculation unit is larger than the standard deviation reference, the boundary calculation unit calculates the boundary after the machining condition is changed until the standard deviation becomes smaller than the standard deviation reference.

3. An electric-discharge machining device comprising:

an electric-discharge-state determination unit that makes a determination as to whether an electric discharging state between a machining electrode and a workpiece is either a state of normal electric discharge or a state of abnormal electric discharge; and a machining-condition switching unit that changes at least one machining condition in machining of the workpiece according to a determination result in the electric-discharge-state determination unit, wherein the electric-discharge machining device further comprises:
   a storage unit that stores therein a state amount according to the electric discharging state as an electric-discharge-state determination indicator that is an indicator for determining the electric discharging state;
   a standard-deviation calculation unit that calculates a standard deviation of the electric-discharge-state determination indicator read from the storage unit; and a boundary calculation unit that calculates a boundary to be applied to the determination as to whether the electric discharging state is of the normal electric discharge or of the abnormal electric discharge made by the electric-discharge-state determination unit based on the electric-discharge-state determination indicator, and wherein in a preparation machining for calculating the boundary in the boundary calculation unit, the machining-condition switching unit changes the machining condition according to a comparison result between the standard deviation calculated by the standard-deviation calculation unit and a standard deviation reference set as a reference of the standard deviation, and when the standard deviation calculated by the standard-deviation calculation unit is smaller than the standard deviation reference, the boundary calculation unit calculates the boundary, and wherein the electric-discharge machining device further comprises a malfunction detection unit that detects an occurrence of a malfunction in the electric-discharge machining device, wherein when the standard deviation presently calculated by the standard-deviation calculation unit is larger than the standard deviation previously calculated by the standard-deviation calculation unit, the malfunction detection unit determines that the malfunction has occurred.

4. The electric-discharge machining device according to claim 1, wherein the machining-condition switching unit changes a setting of an inactive period that is the at least one machining condition.

5. The electric-discharge machining device according to claim 1, wherein the machining-condition switching unit changes a setting of an electric discharging time that is the at least one machining condition.

* * * * *